W. H. ELTON.
Coffee Cleaner.
No. 89,298.                                       Patented April 27, 1869.
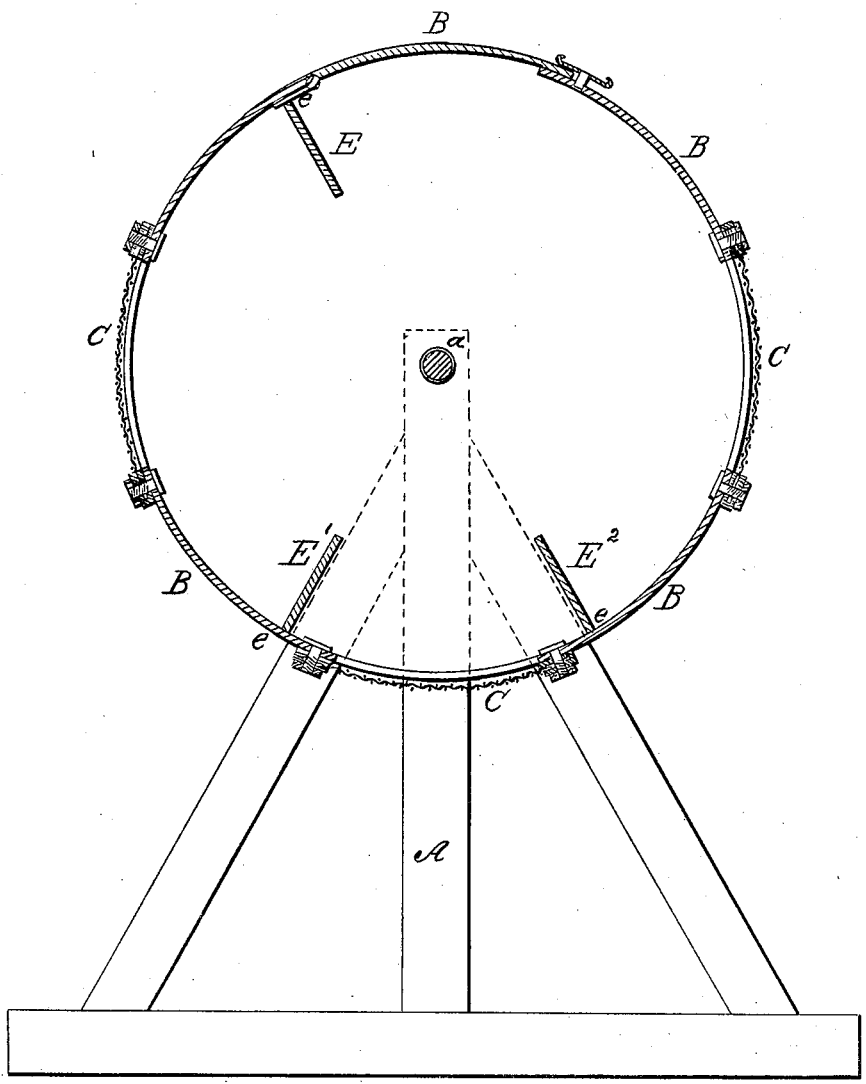
Witnesses:
Baltis DeLong.
John J. Chew
Inventor,
Wm H. Elton.
by his Atty
Wm D. Baldwin

United States Patent Office.

WILLIAM HENRY ELTON, OF BALTIMORE, MARYLAND.

Letters Patent No. 89,298, dated April 27, 1869.

IMPROVED MACHINE FOR CLEANING COFFEE.

The Schedule referred to in these Letters Patent and making part of the same.

*To all whom it may concern:*

Be it known that I, WILLIAM HENRY ELTON, of Baltimore city, in the State of Maryland, have invented a new and useful Improvement in Machinery for Cleaning Coffee, of which the following is a full, clear, and exact description.

In the accompanying drawing, which shows a vertical transverse section through my improved machine, the cylinder is shown as mounted on an axle, $a$, revolving in suitable bearings in a frame, A.

The cylinder is, by preference, formed of sections B of sheet-metal, alternating with wire gauze screens C, secured to the metal sections by screws and nuts, or equivalent fastening, to allow the screens to be removed or replaced, by others of varying fineness, according to the work to be done.

The coffee is supplied to or removed from the cylinder by a door, D, having suitable fastenings, to prevent its accidental opening.

Radial ribs, or shelves E $E^1$ $E^2$ are secured, at their ends, to the inner side of the periphery of the cylinder, in such manner as to leave a small opening between their outer edges, and the periphery of the drum, in order that the fine dust may run through.

The operation is as follows:

The desired quantity of coffee to be cleaned is placed in the cylinder, the door closed, and the cylinder revolved, by power applied in any proper well-known way, at the rate of, say, twenty revolutions per minute.

As the cylinder revolves, the coffee is alternately rubbed over the metallic surface, tumbled over the shelves, and sifted by the screens, thus thoroughly cleaning it.

The dust rubbed off does not tumble over the shelves, but passes through the openings $e$.

The shelves, it will be observed, are not arranged equidistantly around the cylinder, but two of them $E^1$ $E^2$ are arranged one on each side of one screen, while the other E is placed between two screens.

The coffee is thus tumbled alternately over the shelves upon the screen and upon the solid surface, which process aids the cleaning.

What I claim as my invention, and desire to secure by Letters Patent, is—

The cleaning-cylinder, as shown, formed of alternate sections of solid sheet-metal, B, and removable wire cloth C, and provided with radial shelves E $E^1$ $E^2$, and spaces $e$ between the outer edges of said shelves and the periphery of the cylinder, all constructed, arranged, and operating as herein set forth.

In testimony whereof, I have hereunto subscribed my name.

WILLIAM H. ELTON.

Witnesses:
JOE I. PEYTON,
JOHN J. CHEW.